United States Patent
Jia et al.

(10) Patent No.: US 11,252,629 B2
(45) Date of Patent: Feb. 15, 2022

(54) METHOD AND APPARATUS FOR RECOVERING NETWORK CONNECTION AND COMMUNICATION SYSTEM

(71) Applicant: FUJITSU LIMITED, Kawasaki (JP)

(72) Inventors: Meiyi Jia, Beijing (CN); Yulong Shi, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/571,862

(22) Filed: Sep. 16, 2019

(65) Prior Publication Data

US 2020/0015142 A1 Jan. 9, 2020

Related U.S. Application Data

(63) Continuation of application No. PCT/CN2017/078090, filed on Mar. 24, 2017.

(51) Int. Cl.
*H04W 36/30* (2009.01)
*H04W 36/00* (2009.01)
(Continued)

(52) U.S. Cl.
CPC ..... *H04W 36/305* (2018.08); *H04W 36/0069* (2018.08); *H04W 76/19* (2018.02); *H04W 76/27* (2018.02); *H04W 80/02* (2013.01)

(58) Field of Classification Search
CPC .......... H04W 26/0069; H04W 36/305; H04W 76/15; H04W 76/19; H04W 76/27;
(Continued)

(56) References Cited

U.S. PATENT DOCUMENTS

| 9,042,315 B2 | 5/2015 | Lin et al. |
| 9,344,234 B2 | 5/2016 | Lin et al. |

(Continued)

FOREIGN PATENT DOCUMENTS

| CN | 102870450 A | 1/2013 |
| CN | 104349361 A | 2/2015 |

(Continued)

OTHER PUBLICATIONS

Notice of Reasons for Refusal issued by the Japan Patent Office for corresponding Japanese Patent Application No. 2019-551368 dated Aug. 25, 2020, with a full English translation.

(Continued)

*Primary Examiner* — Mewale A Ambaye
(74) *Attorney, Agent, or Firm* — Myers Wolin, LLC.

(57) ABSTRACT

A method and apparatus for recovering network connection and a communication system. In a case where radio link failure occurs in a master base station and a signaling radio bearer of a secondary base station is still available, or a physical layer issue or random access issue occurs in a primary cell but a secondary cell is still available, by transmitting the information on the failure of the master base station and/or the primary cell or autonomously recovering the master base station and/or the primary cell by a UE, the cell or base station where the radio link failure occurs may be quickly changed, connection with the network side may be recovered, and data loss may be reduced.

3 Claims, 5 Drawing Sheets

(51) Int. Cl.
*H04W 80/02* (2009.01)
*H04W 76/27* (2018.01)
*H04W 76/19* (2018.01)

(58) Field of Classification Search
CPC . H04W 80/02; H04W 74/04; H04W 72/0453; H04W 72/042; H04W 24/10; H04W 16/14
See application file for complete search history.

(56) References Cited

U.S. PATENT DOCUMENTS

| | | | |
|---|---|---|---|
| 10,070,476 B2 | 9/2018 | Qin | |
| 10,334,655 B2 | 6/2019 | Qin | |
| 2008/0205262 A1* | 8/2008 | Suzuki | H04Q 11/0062 370/216 |
| 2012/0281548 A1* | 11/2012 | Lin | H04W 36/305 370/242 |
| 2015/0256300 A1 | 9/2015 | Lin et al. | |
| 2016/0100341 A1 | 4/2016 | Wu et al. | |
| 2016/0183321 A1 | 6/2016 | Wen et al. | |
| 2017/0118669 A1 | 4/2017 | Qin | |
| 2017/0202048 A1* | 7/2017 | Qin | H04W 36/0072 |
| 2018/0227980 A1 | 8/2018 | Uchino et al. | |
| 2019/0097936 A1* | 3/2019 | Yang | H04W 28/0268 |
| 2019/0289510 A1* | 9/2019 | Rugeland | H04W 36/30 |
| 2020/0252821 A1* | 8/2020 | Deogun | H04W 74/04 |
| 2020/0305216 A1* | 9/2020 | Kim | H04W 76/19 |
| 2021/0051524 A1* | 2/2021 | Jung | H04W 36/00835 |
| 2021/0105686 A1* | 4/2021 | Jo | H04W 36/14 |

FOREIGN PATENT DOCUMENTS

| | | |
|---|---|---|
| CN | 105472667 A | 4/2016 |
| JP | 2014-514821 A | 6/2014 |
| JP | 2016-527839 A | 9/2016 |
| WO | 2015000184 A1 | 1/2015 |
| WO | 2017/026263 A1 | 2/2017 |

OTHER PUBLICATIONS

Ericsson, "RLM and RLF in case of LTE-NR tight interworking", Agenda Item: 10.2.2.5, 3GPP TSG-RAN WG2 Meeting #97, R2-1700918, Athens, Greece, Feb. 13-17, 2017.

Ericsson, "RLM and RLF in NR", Agenda Item: 10.3.1.1.5, 3GPP TSG-RAN WG2 Meeting #97, R2-1700868, Athens, Greece, Feb. 13-17, 2017.

Etri, "Details on S-RLF in Dual Connectivity", Agenda Item: 7.1.2.2, 3GPP TSG-RAN2 Meeting #87bis, R2-144420, Shanghai, China, Oct. 6-10, 2014.

Fujitsu, "Considerations on radio link failure", Agenda Item: 10.2.3.3, 3GPP TSG-RAN WG2 Meeting #97bis, R2-1703231, Spokane, USA, Apr. 3-7, 2017.

The International Search Report and Written Opinion of the International Searching Authority issued for corresponding International Patent Application No. PCT/CN2017/078090, dated Nov. 1, 2017, with English translation.

* cited by examiner

FIG. 1

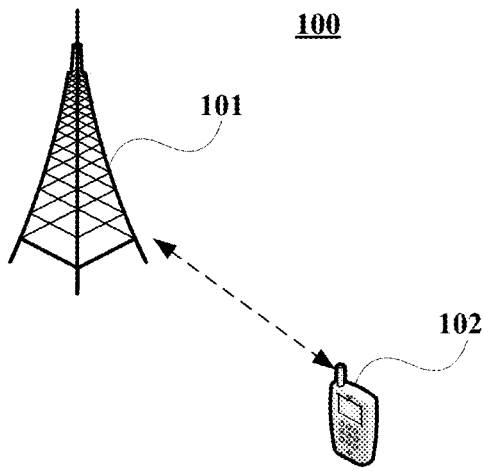

FIG. 2

201 in a case where radio link failure occurs in a first network equipment and/or a first cell, a UE transmits information on the failure of the first network equipment and/or the first cell, or autonomously recovers the first network equipment and/or the first cell

FIG. 3

301 the second network equipment receives a radio link failure report transmitted by a UE via a split SRB, or a radio link failure report of a first network equipment transmitted by the UE via an SCG SRB

302 the second network equipment transmits the radio link failure report or a message of the radio link failure of the first network equipment to a network side

METHOD AND APPARATUS FOR RECOVERING NETWORK CONNECTION AND COMMUNICATION SYSTEM

CROSS REFERENCE TO RELATED APPLICATIONS

This application is a continuation application of International Application PCT/CN2017/078090 filed on Mar. 24, 2017, the entire contents of which are incorporated herein by reference.

FIELD

This disclosure relates to the field of communications, and in particular to a method and apparatus for recovering network connection and a communication system.

BACKGROUND

Radio link monitoring as well as triggering and report of radio link failure are hotspots in studies of wireless communication systems.

In a long term evolution (LTE) system, when a physical layer issue occurs, or a random access issue occurs, or a protocol data unit (PDU) of any radio link control (RLC) layer reaches a maximum number of times of retransmission, a radio resource control (RRC) layer announces that the radio link fails. When the radio link failure occurs, a user equipment (UE) initiates a connection re-establishment procedure to attempt to recover RRC connection.

In a case where the UE is configured with carrier aggregation (CA), the UE may transmit and receive data on a primary cell (PCell) and a plurality of secondary cells (SCells). And when a physical layer issue occurs in the PCell, or a random access issue occurs in the PCell, or any RLC PDU reaches a maximum number of times of retransmission, an RRC layer announces that the radio link fails. When the radio link failure occurs, the UE initiates a connection re-establishment procedure to attempt to recover RRC connection.

In a case when the UE is configured with dual-connectivity, the UE may transmit and receive data via a master base station (MeNB) and a secondary base station (SeNB). When a physical layer issues occurs in the secondary base station, or a random access issues occurs in the secondary base station, or any RLC PDU in the secondary base station reaches a maximum number of times of retransmission, an RRC layer announces that a radio link of the secondary base station fails. When the radio link failure occurs in the secondary base station, the UE transmit a secondary cell group failure report to the master base station, and the master base station may remove or replace the secondary base station based on the report. Furthermore, when radio link failure occurs in the master base station, the UE initiates an RRC connection re-establishment procedure to attempt to recover RRC connection.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in a case where radio link failure occurs in a master base station but a signaling radio bearer of a secondary base station is still available, or in a case where a physical layer issue or a random access issue occurs in the master base station but the secondary base station is still available, if UE simply initiates a connection re-establishment procedure, connection with the network side is unable to be recovered quickly, thereby increasing data loss.

In order to solve the above problem, embodiments of this disclosure provide a method and apparatus for recovering network connection and a communication system, so as to quick recover connection with the network side in a case where radio link failure occurs and reduce data loss.

According to a first aspect of the embodiments of this disclosure, there is provided a method for recovering network connection, including:
 in a case where radio link failure occurs in a first network equipment and/or a first cell, transmitting information on the failure of the first network equipment and/or the first cell, or autonomously recovering the first network equipment and/or the first cell, by a UE.

According to a second aspect of the embodiments of this disclosure, there is provided a method for recovering network connection, including:
 receiving, by a second network equipment, a radio link failure report transmitted by a UE via a split signaling radio bearer, or a radio link failure report of a first network equipment transmitted by the UE via a secondary cell group signaling radio bearer; and
 transmitting the radio link failure report or a message of the radio link failure of the first network equipment by the second network equipment to a network side.

According to a third aspect of the embodiments of this disclosure, there is provided a method for recovering network connection, including:
 receiving, by a first network equipment, a failure report of a first cell transmitted by a UE, or a radio link failure report or a message of radio link failure of a first network equipment transmitted by a second network equipment; and
 changing a first cell for the UE and maintaining a second cell according to the failure report of a first cell, or changing first network equipment for the UE and/or changing a first cell for the UE according to the radio link failure report or the message of radio link failure of the first network equipment, by the first network equipment.

According to a fourth aspect of the embodiments of this disclosure, there is provided an apparatus for recovering network connection, configured in a UE, the apparatus including:
 a first processing unit configured to, in a case where radio link failure occurs in a first network equipment and/or a first cell, transmit information on the failure of the first network equipment and/or the first cell, or autonomously recover the first network equipment and/or the first cell.

According to a fifth aspect of the embodiments of this disclosure, there is provided an apparatus for recovering network connection, configured in a second network equipment, the apparatus including:
 a receiving unit configured to receive a radio link failure report transmitted by a UE via a split signaling radio bearer, or a radio link failure report of a first network equipment transmitted by the UE via a secondary cell group signaling radio bearer; and a transmitting unit configured to transmit the radio link failure report or a message of the radio link failure of the first network equipment to a network side.

According to a sixth aspect of the embodiments of this disclosure, there is provided an apparatus for recovering network connection, configured in a first network equipment, the apparatus including:

a receiving unit configured to receive a failure report of a first cell transmitted by a UE, or a radio link failure report or a message of radio link failure of a first network equipment transmitted by a second network equipment; and a processing unit configured to change a first cell for the UE and maintain a second cell according to the failure report of a first cell, or change first network equipment for the UE and/or change a first cell for the UE according to the radio link failure report or the message of radio link failure of the first network equipment.

According to a seventh aspect of the embodiments of this disclosure, there is provided a UE, including the apparatus described in the fourth aspect.

According to an eighth aspect of the embodiments of this disclosure, there is provided a network equipment, including the apparatus described in the fifth or the sixth aspect.

According to a ninth aspect of the embodiments of this disclosure, there is provided a communication system, including the UE described in the seventh aspect and the network equipment described in the eighth aspect.

An advantage of the embodiments of this disclosure exists in that in a case where radio link failure occurs in the first network equipment but a signaling radio bearer of the second network equipment is still available, or a physical layer issue or random access issue occurs in a first cell but a second cell is still available, the UE transmits the information on the failure of the first network equipment or the first cell or autonomously recovers the first network equipment or the first cell, thereby quickly changing the first network equipment or the first cell, recovering connection with the network side, and reducing data loss.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. The same element is represented with the same reference number throughout the drawings. In the drawings:

FIG. 1 is a schematic diagram of a communication system of an embodiment of this disclosure;

FIG. 2 is a schematic diagram of the method for recovering network connection of Embodiment 1 of this disclosure;

FIG. 3 is a schematic diagram of the method for recovering network connection of Embodiment 2 of this disclosure;

DETAILED DESCRIPTION

Figure 4:
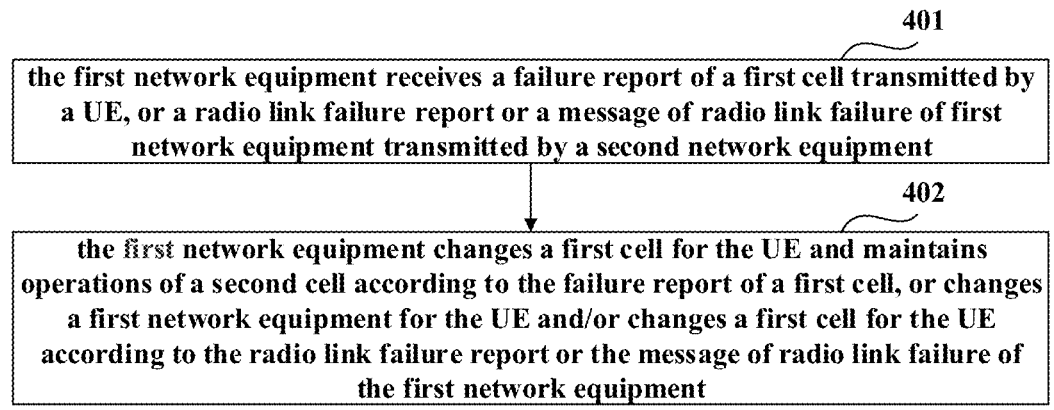
FIG. 4 is a schematic diagram of the method for recovering network connection of Embodiment 3 of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the"

should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G 2.5G 2.75G 3G 4G 4.5G and 5G and new radio (NR) in the future, and/or other communication protocols that are currently known or will be developed in the future.

In the embodiments of this disclosure, the term "network equipment", for example, refers to a device in a communication system that accesses a user equipment to the communication network and provides services for the user equipment. The network equipment may include but not limited to the following devices: a base station (BS), an access point (AP), a transmission reception point (TRP), a broadcast transmitter, a mobile management entity (MME), a gateway, a server, a radio network controller (RNC), a base station controller (BSC).

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, the embodiments of this disclosure are not limited thereto.

FIG. 1 is a schematic diagram of a communication system of an embodiment of this disclosure, in which a case where UE and network equipment are taken as examples is schematically shown. As shown in FIG. 1, a communication system 100 may include network equipment 101 and UE 102 (for the sake of simplicity, FIG. 1 shall be described by taking only one piece of UE as an example).

In the embodiment of this disclosure, existing traffics or traffics that may be implemented in the future may be performed between the network equipment 101 and the UE 102. For example, such traffics may include but not limited to an enhanced mobile broadband (eMBB), massive machine type communication (MTC), and ultra-reliable and low-latency communication (URLLC).

The UE 102 may transmit data to the network equipment 101, for example, in a grant-free transmission manner. The network equipment 101 may receive data transmitted by one or more pieces of UE 102, and feed back information (such as acknowledgement (ACK)/non-acknowledgement (NACK) information) to the UE 102, and the UE 102 may acknowledge termination of a transmission process, or may perform new data transmission, or may perform data retransmission.

In the studies of new radio (NR) systems, an agreement has been made for an evolved universal mobile telecommunication system terrestrial radio access network (E-UTRAN) and the NR dual-connectivity with respect to the following: a UE may be configured with a secondary cell group (SCG) signaling radio bearer (SRB), so as to permit directly transmitting a secondary node (SN) RRC message between the UE and a secondary base station; and split SRBs are supported.

The embodiments of this disclosure shall be described below with reference to the accompanying drawings.

Embodiment 1

The embodiment of this disclosure provides a method for recovering network connection, which may be applicable to a UE side, such as a UE. FIG. 2 is a schematic diagram of the method. As shown in FIG. 2, the method includes:
  step 201: in a case where radio link failure occurs in a first network equipment and/or a first cell, a UE transmits information on the failure of the first network equipment and/or the first cell, or autonomously recovers the first network equipment and/or the first cell.

In this embodiment, the first network equipment is, for example, a master base station in a case where the UE is configured with dual-connectivity, the second network equipment is, for example, a secondary base station in a case where the UE is configured with dual-connectivity, the first cell is, for example, a primary cell in a case where the UE is configured with carrier aggregation, and the second cell is, for example, a secondary cell in a case where the UE is configured with carrier aggregation; however, this embodiment is not limited thereto.

In this embodiment, the case where radio link failure occurs in the first network equipment may include that: in a case where the UE is configured with dual-connectivity, radio link failure occurs in the first network equipment, but a signaling radio bearer of the second network equipment is still available. In this embodiment, the UE is configured with dual-connectivity, that is, the UE may receive and transmit data via the first network equipment and second network equipment, and when radio link failure occurs in the first network equipment, but a signaling radio bearer of the second network equipment is still available, by transmitting information on failure of the first network equipment or autonomously recovering the first network equipment, the UE may change the first network equipment quickly and recover connection with the network side, thereby reducing data loss.

In this embodiment, the case where radio link failure occurs in a first cell may include that: in a case where the UE is configured with carrier aggregation, a physical layer issue or a random access problem occurs in the first cell, but the second cell is still available. In this embodiment, the UE is configured with carrier aggregation, that is, the UE may receive and transmit data in the first cell and the plurality of second cells, and when a physical layer issue or a random access issue occurs in the first cell but a second cell is still available, via transmitting information on failure of the first cell by the UE or autonomously recovering the first cell by the UE, the first cell can be changed quickly and connection with the network side can be recovered, thereby reducing data loss.

In this embodiment, after the UE transmits the information on the failure of the first network equipment and/or the first cell, the network side may change the first network equipment and/or the first cell for the UE, so that the UE recovers the connection with the network side, thereby reducing data loss.

In one implementation, in a case where the UE is configured with dual-connectivity, the UE may transmit a radio link failure report to the network side (such as the first network equipment) through the second network equipment via a split SRB, so as to transmit the information on the failure of the first network equipment.

In this implementation, in a case where the UE supports a split SRB, it may transmit the radio link failure report to the first network equipment through the second network equipment via the split SRB, so as to transmit the information on the failure of the first network equipment to the first network equipment.

In this implementation, the radio link failure report may include information on failure of a first cell group (MCG) and/or information on failure of a second cell group (SCG); however, this embodiment is not limited thereto. Hence, the network side may change the MCG and/or the SCG for the UE according to the information.

In this implementation, if the UE is configured with carrier aggregation at the same time, the UE may add information on the failure of the first cell or failure of the network equipment into the radio link failure report. In this implementation, occurrence of the physical layer issue or the random access issue means that radio link failure occurs in the first cell, and any RLC PDU reaching the maximum number of times of retransmission means that radio link failure occurs in the network equipment. Hence, the network side may change the first cell for the UE or change the network equipment for the UE according to the information.

In another implementation, in a case where the UE is configured with dual-connectivity, the UE may transmit a radio link failure report of the first network equipment to the second network equipment via an SCG SRB, so that the second network equipment transmits a message of radio link failure of the first network equipment to the network side (such as the first network equipment), thereby transmitting the information on the failure of the first network equipment.

In this implementation, in a case where the UE is configured with an SCG SRB, it may transmit the radio link failure report of the first network equipment to the second network equipment via the SCG SRB, and the second network equipment interprets the case where radio link failure occurs in the first network equipment, and transmits a message of the radio link failure of the first network equipment to the first network equipment via an interface between the second network equipment and the first network equipment.

In this implementation, the radio link failure report of the first network equipment may contain contents identical to those in the radio link failure report in the previous implementation; however, this embodiment is not limited thereto.

In another implementation, in a case where the UE is configured with carrier aggregation, the UE can transmit the information on the failure of the first cell to the network side, and the network side may change the first cell for the UE according to the information on the failure of the first cell, and maintain the second cell at the same time.

In this implementation, the UE may transmit the information on the failure of the first cell via physical layer signaling or media access control (MAC) sub-layer signaling, such as random access, and a scheduling request, or can transmit the information on the failure of the first cell to the network side by transmitting the failure report of the first cell to the network side; however, this embodiment is not limited thereto.

In this implementation, as the second cell of the UE is still available, the UE may transmit the failure report of the first cell to the network side via the second cell, and the network side may maintain the second cell. A manner for transmitting the failure report of the first cell and contents thereof are not limited in this embodiment, and a manner of changing the first cell and maintaining the second cell by the network side is also not limited in this embodiment.

In this embodiment, the UE autonomously recovers the first network equipment and/or the first cell, and may, without via the network side, recover connection with the network side quickly, thereby reducing data loss.

In one implementation, if only a signaling radio bearer (SRB) fails and a data radio bearer (DRB) does not fail, that is, the RLC PDU reaching the maximum number of times of retransmissions is transmitted on the signaling radio bearer and there exists no RLC PDU reaching the maximum number of times of retransmissions on any data radio bearer, the UE may attempt RRC connection reestablishment while maintaining the data radio bearer. Thus, by autonomous recovery, the UE may also recover the connection with the network side, thereby reducing data loss.

In this implementation, the UE may determine whether the signaling radio bearer fails or the data radio bearer fails by judging whether the RLC PDU reaching the maximum number of times of retransmissions is transmitted on the signaling radio bearer or the data radio bearer; however, this embodiment is not limited thereto.

In this implementation, a manner in which the UE performs RRC connection reestablishment is not limited, and a manner in which the UE maintains the data radio bearer is also not limited.

In another implementation, in a case where the UE is configured with carrier aggregation, if the first cell of the UE fails and the second cell is available, that is, the radio link failure is caused by a physical layer issue or a random access issue, the UE can perform autonomous recovery of the first cell.

For example, the UE may initiate random access to other cells belonging to the same network equipment as the first cell, request for changing a cell as the first cell of the UE, and at the same time maintain the second cell.

In this implementation, as the other cells belonging to the same network equipment as the first cell are also available, the UE may initiate a random access procedure to one of the other cells, requesting for taking the cell as its first cell, thereby achieving autonomous recovery of the first cell.

In this implementation, a cell selected by the UE to initiate the random access procedure is not limited. For example, it may, by channel measurement, select a cell of highest channel quality or a cell of least interference to perform random access.

In this implementation, the other cells belonging to the same network equipment as the first cell may be the second cell of the UE; however, this embodiment is not limited thereto.

In another implementation, in a case where the UE is configured with dual-connectivity, if the first network equipment of the UE fails and the second network equipment is available, the UE may perform autonomous recovery of the first network equipment.

For example, if the first network equipment is not configured with carrier aggregation and the signaling radio bearer fails but the data radio bearer does not fail, the UE may initiate a signaling radio bearer recovery process on the other cells of the first network equipment and maintain the data radio bearer and the second network equipment. Hence, the UE completes the autonomous recovery of the first network equipment.

In this embodiment, a manner in which the UE initiates the signaling radio bearer recovery procedure is not limited, and a manner of maintaining the data radio bearer and the second network equipment is also not limited.

For another example, if the first network equipment is configured with carrier aggregation and radio link failure occurs in the first cell of the first network equipment, the UE may initiate a process for changing the first cell in other cells of the first network equipment. Hence, the UE completes the autonomous recovery of the first cell, and as the first cell belongs to the first network equipment, it is equivalent to that the autonomous recovery of the first network equipment is completed.

In this embodiment, a manner in which the UE initiates the process of changing the first cell is not limited.

In this embodiment, in a case where the UE is configured with dual-connectivity and radio link failure occurs in the second network equipment but radio link failure does not occur in the first network equipment, the UE may autonomously recover the second network equipment. Hence, connection with the network side may be recovered quickly, and data loss may be reduced.

In one implementation, in a case where the second network equipment is not configured with carrier aggregation and a signaling radio bearer fails but a data radio bearer does not fail, the UE may initiate a recovery process of the signaling radio bearer in other cells of the second network equipment, and maintain the data radio bearer and the first network equipment. Hence, the UE completes the autonomous recovery of the second network equipment.

In this implementation, a manner for initiating a recovery process of the signaling radio bearer is not limited, and a manner for maintaining the data radio bearer and the first network equipment is also not limited.

In another implementation, in a case where the second network equipment is configured with carrier aggregation and radio link failure occurs in the first cell of the second network equipment, the UE may initiate a process for changing the first cell in other cells of the second network equipment. Hence, the UE completes the autonomous recovery of the first cell of the second network equipment, and as the first cell belongs to the second network equipment, it is equivalent to that the autonomous recovery of the second network equipment is completed.

In this implementation, a manner for initiating a process of changing the first cell by the UE is not limited.

With the method of this embodiment, in a case where radio link failure occurs in a first network equipment (such as a master base station) and a signaling radio bearer of a second network equipment (such as a secondary base station) is still available, or a physical layer issue or random access issue occurs in a first cell (such as a primary cell) but a second cell (such as a secondary cell) is still available, by transmitting the information on the failure of the first network equipment and/or the first cell or autonomously recovering the first network equipment and/or the first cell by the UE, the cell or network equipment where the radio link failure occurs may be quickly changed, connection with the network side may be recovered, and data loss may be reduced.

Embodiment 2

The embodiment of this disclosure provides a method for recovering network connection, which may be applicable to a network side, such as a network equipment. This method is processing at a second network equipment side corresponding to the method of Embodiment 1, with contents identical to those in Embodiment 1 being not going to be described herein any further.

FIG. 3 is a schematic diagram of the method. As shown in FIG. 3, the method includes:
  step 301: the second network equipment receives a radio link failure report transmitted by a UE via a split SRB, or a radio link failure report of a first network equipment transmitted by the UE via an SCG SRB; and
  step 302: the second network equipment transmits the radio link failure report or a message of the radio link failure of the first network equipment to a network side.

In this embodiment, the network side here is, for example, the first network equipment described above, and the second network equipment may transmit the above information to the first network equipment via an interface between the second network equipment and the first network equipment.

With the method of this embodiment, the network side may change the first network equipment for the UE according to the above information, so that the UE may recover connection with the network side, thereby reducing data loss.

Embodiment 3

The embodiment of this disclosure provides a method for recovering network connection, which may be applicable to a network side, such as a network equipment. This method is processing at a first network equipment side corresponding to the methods of embodiments 1 and 2, with contents identical to those in embodiments 1 and 2 being not going to be described herein any further.

FIG. 4 is a schematic diagram of the method. As shown in FIG. 4, the method includes:
  step 401: the first network equipment receives a failure report of a first cell transmitted by a UE, or a radio link failure report or a message of radio link failure of a first network equipment transmitted by a second network equipment; and
  step 402: the first network equipment changes a first cell for the UE and maintains a second cell according to the failure report of a first cell, or changes a first network equipment for the UE and/or changes a first cell for the UE according to the radio link failure report or the message of radio link failure of the first network equipment.

With the method of this embodiment, the network side may change the first network equipment and/or the first cell for the UE according to the information fed back by the UE or the first network equipment, so that the UE may recover connection with the network side quickly, thereby reducing data loss.

Figure 5:
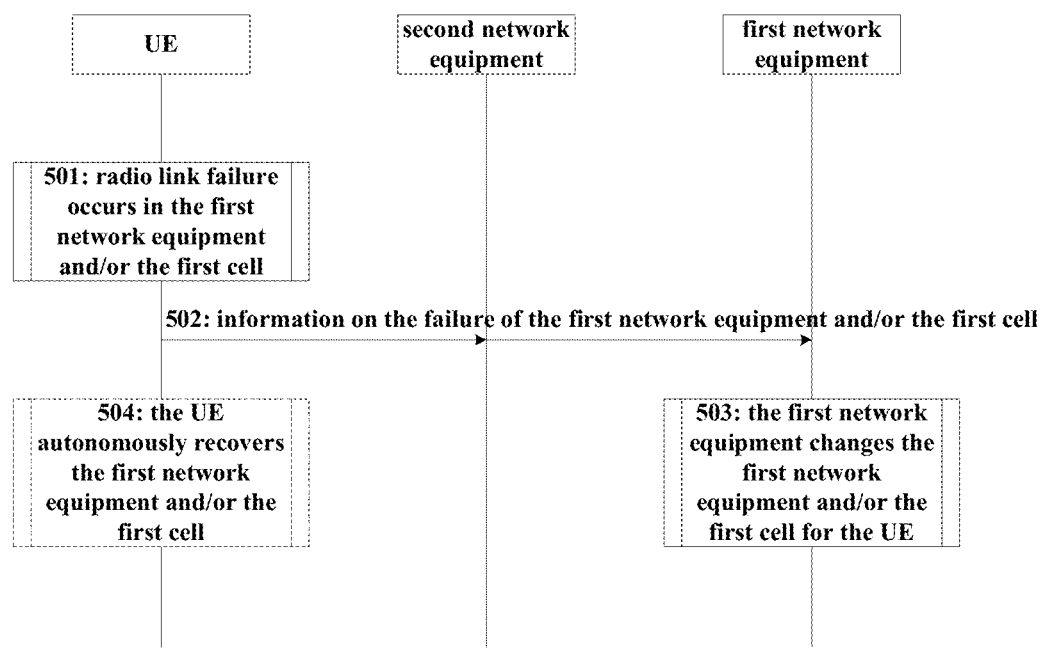
FIG. 5 is a schematic diagram of the methods for recovering network connection of embodiments 1-3 of this disclosure.

FIG. 5 is processing of the UE, the first network equipment and the second network equipment corresponding to the methods of embodiments 1-3. As shown in FIG. 5, the process includes:

step 501: the UE determines that radio link failure occurs in the first network equipment and/or the first cell;

in step 501, how to determine by the UE that radio link failure occurs in the first network equipment and/or the first cell is not limited in this embodiment; for example, the UE may determine by monitoring the radio link;

step 502: the UE transmits information on the failure of the first network equipment and/or the first cell to the first network equipment;

in step 502, the UE may transmit the above information to the first network equipment via the second network equipment; for example, in a case where the UE is configured with dual-connectivity, the UE may transmit the information on the failure of the first network equipment to the first network equipment through the second network device equipment via a split SRB or an SCG SRB; or the UE may transmit the above information by itself; for example, in a case where the UE is configured with carrier aggregation, the UE may transmit the information on the failure of the first cell via the second cell, as described in Embodiment 1, which shall not be described herein any further;

step 503: the first network equipment changes the first network equipment and/or the first cell for the UE; and step 504: the UE autonomously recovers the first network equipment and/or the first cell.

In step 504, if the SRB fails and the DRB does not fail, the UE may attempt RRC connection reestablishment while maintaining the DRB; if the UE is configured with carrier aggregation, the UE may initiate random access to other cells in the same network equipment, request for changing a cell as its first cell, and maintain its second cell at the same time, thereby completing autonomous recovery of the first cell; if the UE is configured with dual-connectivity, in a case where the UE is configured with carrier aggregation at the same time, if the first cell of the first network equipment fails, the UE may initiate a process for changing the first cell to other cells of the first network equipment, thereby performing autonomous recovery of the first cell of the first network equipment; and if the UE is configured with dual-connectivity but is not configured with carrier aggregation, if the SRB fails and the DRB does not fail, the UE may initiate a process for recovering the SRB in other cells of the first network equipment and maintain the DRB and the second network equipment, thereby performing autonomous recovery of the first network equipment.

In the description of FIG. 5, steps 502-503 and step 504 are alternative, that is, when radio link failure occurs in the first network equipment and/or the first cell, the first network equipment may change the first network equipment and/or the first cell for the UE in steps 502-503, or the UE may autonomously recover the first network equipment and/or the first cell in step 504, with details being as described above, which shall not be described herein any further.

Embodiment 4

The embodiment of this disclosure provides an apparatus for recovering network connection, which may be configured in a UE. As principles of the apparatus for solving problems are similar to that of the method of Embodiment 1, reference may be made to implementation of the method of Embodiment 1 for particular implementation of this apparatus, with identical contents being not going to be described herein any further.

Figure 6:
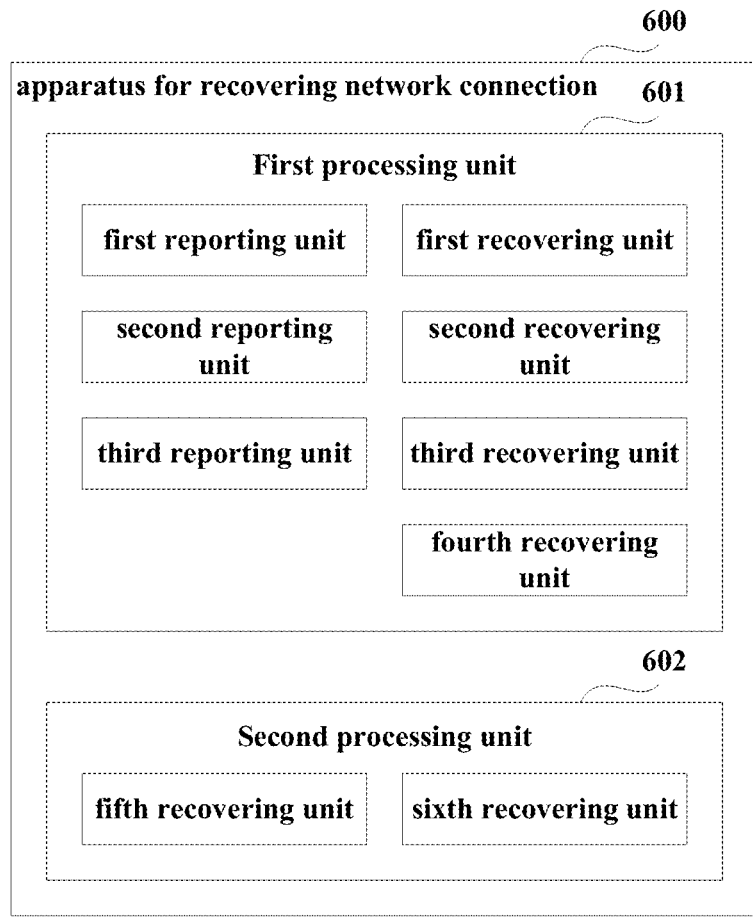
FIG. 6 is a schematic diagram of the apparatus for recovering network connection of Embodiment 4 of this disclosure.

FIG. 6 is a schematic diagram of the apparatus of this embodiment. As shown in FIG. 6, an apparatus for recovering network connection 600 includes:

a first processing unit 601 configured to, in a case where radio link failure occurs in a first network equipment and/or a first cell, transmit information on the failure of the first network equipment and/or the first cell, or autonomously recover the first network equipment and/or the first cell.

In this embodiment, the case where radio link failure occurs in a first network equipment includes that: in a case where the UE is configured with dual-connectivity, radio link failure occurs in the first network equipment, but a signaling radio bearer of second network equipment is still available.

In this embodiment, the case where radio link failure occurs in a first cell includes that: in a case where the UE is configured with carrier aggregation, a physical layer issue or a random access issue occurs in the first cell, but a second cell is still available.

In one implementation of this embodiment, as shown in FIG. 6, the first processing unit 601 includes a first reporting unit 6011 configured to, in a case where the UE is configured with dual-connectivity, transmit a radio link failure report to a network side through the second network equipment via a split signaling radio bearer (SRB), thereby transmitting information on the failure of the first network equipment.

In this implementation, the radio link failure report includes: information on failure of a first cell group and/or information on failure of a second cell group.

In this implementation, in a case where the UE is configured with carrier aggregation, the radio link failure report includes: information on failure of the first cell or information on failure of the network equipment.

In one implementation of this embodiment, as shown in FIG. 6, the first processing unit 601 includes a second reporting unit 6012 configured to, in a case where the UE is configured with dual-connectivity, transmit a radio link failure report of the first network equipment to the second network equipment via a secondary cell group signaling radio bearer (SCG SRB), so that the second network equipment transmits a message of radio link failure of the first network equipment to a network side, thereby transmitting information on the failure of the first network equipment.

In one implementation of this embodiment, as shown in FIG. 6, the first processing unit 601 includes a third reporting unit 6013 configured to, in a case where the UE is configured with carrier aggregation, transmit information on failure of the first cell to the network side, so that the network side changes a first cell for the UE according to the information on failure of the first cell and maintains the second cell.

In this implementation, the third reporting unit 6013 may transmit the failure report of the first cell to the network side, or may transmit the information on the failure of the first cell to the network side via physical layer signaling or media access control (MAC) sub-layer signaling, such as random access, and a scheduling request, etc.; however, this implementation is not limited thereto.

In one implementation of this embodiment, as shown in FIG. 6, the first processing unit 601 includes a first recovering unit 6014 configured to, in a case where a signaling radio bearer fails but a data radio bearer does not fail, perform RRC connection re-establishment and maintain the data radio bearer, thereby autonomously recovering the first network equipment and/or the first cell.

In one implementation of this embodiment, as shown in FIG. 6, the first processing unit 601 includes a second recovering unit 6015 configured to, in a case where the UE is configured with carrier aggregation, initiate random access to other cells belonging to the same network equipment as the first cell, request for replacing the first cell with a cell, and at the same time maintain the second cell, thereby autonomously recovering the first cell.

In one implementation of this embodiment, as shown in FIG. 6, the first processing unit 601 includes a third recovering unit 6016 configured to, in a case where the UE is configured with dual-connectivity, if the first network equipment is not configured with carrier aggregation and a signaling radio bearer fails but a data radio bearer does not fail, initiate a recovery process of the signaling radio bearer in other cells of the first network equipment, and maintain the data radio bearer and the second network equipment, thereby autonomously recovering the first network equipment.

In one implementation of this embodiment, as shown in FIG. 6, the first processing unit 601 includes a fourth recovering unit 6017 configured to, in a case where the UE is configured with dual-connectivity, if the first network equipment is configured with carrier aggregation and radio link failure occurs in the first cell of the first network equipment, initiate a process for changing the first cell in other cells of the first network equipment, thereby autonomously recovering the network equipment.

In this embodiment, as shown in FIG. 6, the apparatus 600 may further include:
- a second processing unit 602 configured to, in a case where the UE is configured with dual-connectivity and radio link failure occurs in the second network equipment but radio link failure does not occur in the first network equipment, autonomously recover the second network equipment.

In one implementation, as shown in FIG. 6, the second processing unit 602 includes a fifth recovering unit 6021 configured to, in a case where the second network equipment is not configured with carrier aggregation and a signaling radio bearer fails but a data radio bearer does not fail, initiate a recovery process of the signaling radio bearer in other cells of the second network equipment, and maintain the data radio bearer and the first network equipment, thereby autonomously recovering the second network equipment.

In another implementation, as shown in FIG. 6, the second processing unit 602 includes a sixth recovering unit 6022 configured to, in a case where the second network equipment is configured with carrier aggregation and radio link failure occurs in the first cell of the second network equipment, initiate a process for changing the first cell in other cells of the second network equipment, thereby autonomously recovering the second network equipment.

With the apparatus of this embodiment, in a case where radio link failure occurs in a first network equipment (such as a master base station) and a signaling radio bearer of a second network equipment (such as a secondary base station) is still available, or a physical layer issue or random access issue occurs in a first cell (such as a primary cell) but a second cell (such as a secondary cell) is still available, by transmitting the information on the failure of the first network equipment and/or the first cell or autonomously recovering the first network equipment and/or the first cell by the UE, the cell or network equipment where the radio link failure occurs may be quickly changed, connection with the network side may be recovered, and data loss may be reduced.

Embodiment 5

The embodiment of this disclosure provides an apparatus for recovering network connection, which may be configured in a network equipment. As principles of the apparatus for solving problems are similar to that of the method of Embodiment 2, reference may be made to implementation of the method of Embodiment 2 for particular implementation of this apparatus, with identical contents being not going to be described herein any further.

Figure 7:
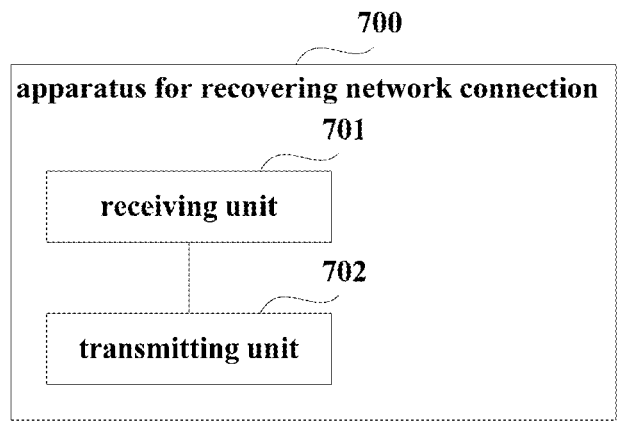
FIG. 7 is a schematic diagram of the apparatus for recovering network connection of Embodiment 5 of this disclosure.

FIG. 7 is a schematic diagram of the apparatus of this embodiment. As shown in FIG. 7, an apparatus for recovering network connection 700 includes a receiving unit 701 and a transmitting unit 702. The receiving unit 701 is configured to receive a radio link failure report transmitted by UE via a split signaling radio bearer, or a radio link failure report of a first network equipment transmitted by the UE via a secondary cell group signaling radio bearer, and the transmitting unit 702 is configured to transmit the radio link failure report or a message of the radio link failure of the first network equipment to a network side.

With the apparatus of this embodiment, the network side may change the first network equipment for the UE according to the above information, so that the UE may recover connection with the network side, thereby reducing data loss.

Embodiment 6

The embodiment of this disclosure provides an apparatus for recovering network connection, which may be configured in a network equipment. As principles of the apparatus for solving problems are similar to that of the method of Embodiment 3, reference may be made to implementation of the method of Embodiment 3 for particular implementation of this apparatus, with identical contents being not going to be described herein any further.

Figure 8:
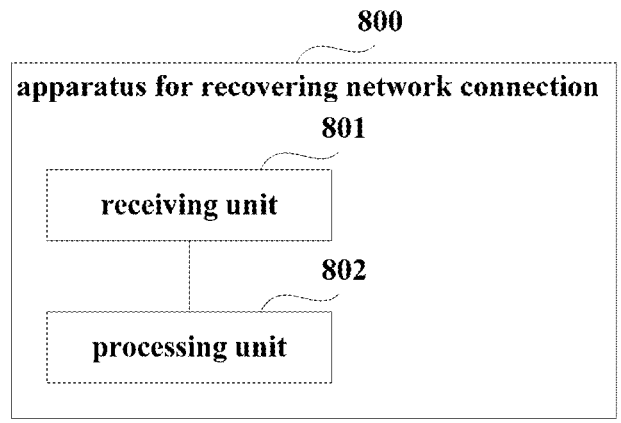
FIG. 8 is a schematic diagram of the apparatus for recovering network connection of Embodiment 6 of this disclosure.

FIG. 8 is a schematic diagram of the apparatus of this embodiment. As shown in FIG. 8, an apparatus for recovering network connection 800 includes a receiving unit 801 and a processing unit 802. The receiving unit 801 is configured to receive a failure report of a first cell transmitted by UE, or a radio link failure report or a message of radio link failure of a first network equipment transmitted by a second network equipment, and the processing unit 802 is configured to change a first cell for the UE and maintain a second cell according to the failure report of a first cell, or change first network equipment for the UE and/or change a first cell for the UE according to the radio link failure report or the message of radio link failure of the first network equipment.

With the apparatus of this embodiment, the network side may change the first network equipment and/or the first cell for the UE according to the information fed back by the UE or by the first network equipment, so that the UE may quickly recover connection with the network side, thereby reducing data loss.

Embodiment 7

The embodiment of this disclosure provides a UE, including the apparatus for recovering network connection described in Embodiment 4.

Figure 9:
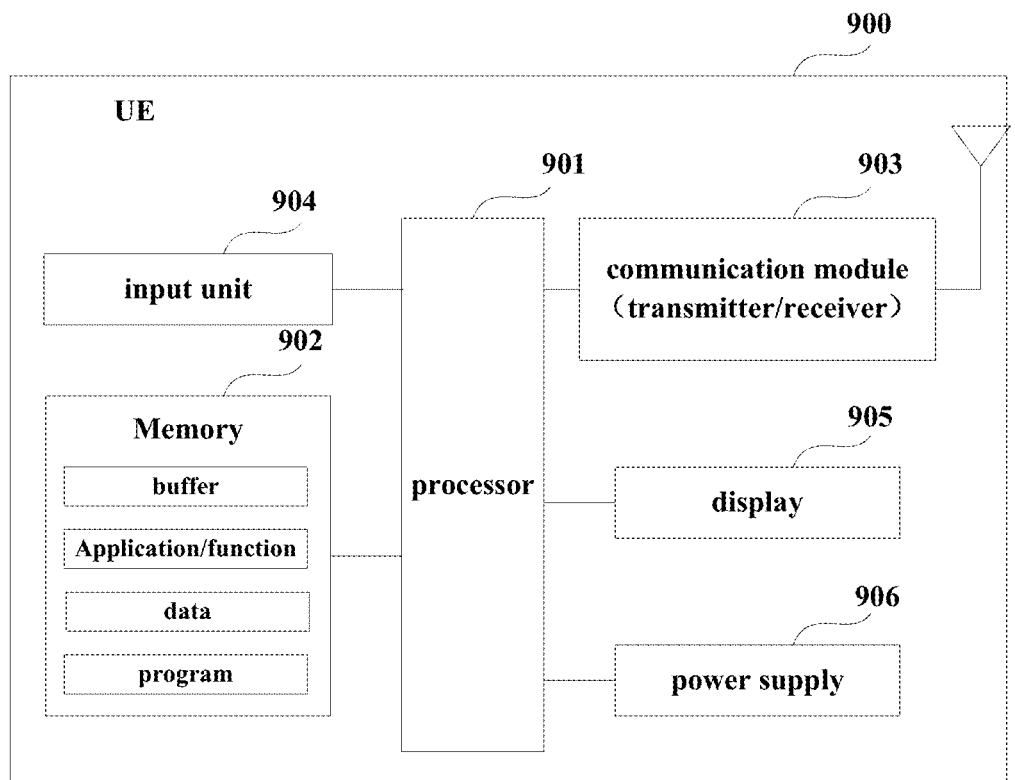
FIG. 9 is a schematic diagram of a structure of the user equipment of Embodiment 7 of this disclosure.

FIG. 9 is a schematic diagram of a structure of a UE 900 of this embodiment. As shown in FIG. 9, the UE 900 may include a processor 901 and a memory 902, the memory 902 being coupled to the processor 901. It should be noted that this figure is illustrative only, and other types of structures may also be used, so as to supplement or replace this structure and achieve a telecommunications function or other functions.

In one implementation, the functions of the apparatus for recovering network connection may be integrated into the processor 901. For example, the processor 901 may be configured to: in a case where radio link failure occurs in a first network equipment and/or a first cell, transmit information on the failure of the first network equipment and/or the first cell, or autonomously recover the first network equipment and/or the first cell.

In another implementation, the apparatus for recovering network connection and the processor 901 may be configured separately. For example, the apparatus for recovering network connection may be configured as a chip connected to the processor 901, with its functions being realized under control of the processor 901.

As shown in FIG. 9, the UE 900 may further include a communication module 903, an input unit 904, a display 905, and a power supply 906. It should be noted that the UE 900 does not necessarily include all the parts shown in FIG. 9, and furthermore, the UE 900 may include parts not shown in FIG. 9, and the related art may be referred to.

As shown in FIG. 9, the processor 901 is sometimes referred to as a controller or control, which may include a microprocessor or other processor devices and/or logic devices, and the processor 901 receives input and controls operations of every component of the UE 900.

The memory 902 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the processor 901 may execute programs stored in the memory 902, so as to realize information storage or processing, etc. Functions of other parts are similar to those of the related art, which shall not be described herein any further. The parts of the UE 900 may be realized by specific hardware, firmware, software, or any combination thereof, without departing from the scope of this disclosure.

With the UE of this embodiment, in a case where radio link failure occurs in a first network equipment (such as a master base station) and a signaling radio bearer of a second network equipment (such as a secondary base station) is still available, or a physical layer issue or random access issue occurs in a first cell (such as a primary cell) but a second cell (such as secondary cell) is still available, by transmitting the information on the failure of the first network equipment and/or the first cell or autonomously recovering the first network equipment and/or the first cell by the UE, the cell or network equipment where the radio link failure occurs may be quickly changed, connection with the network side may be recovered, and data loss may be reduced.

Embodiment 8

The embodiment of this disclosure provides a network equipment, including the apparatus for recovering network connection described in Embodiment 5 or Embodiment 6.

Figure 10:
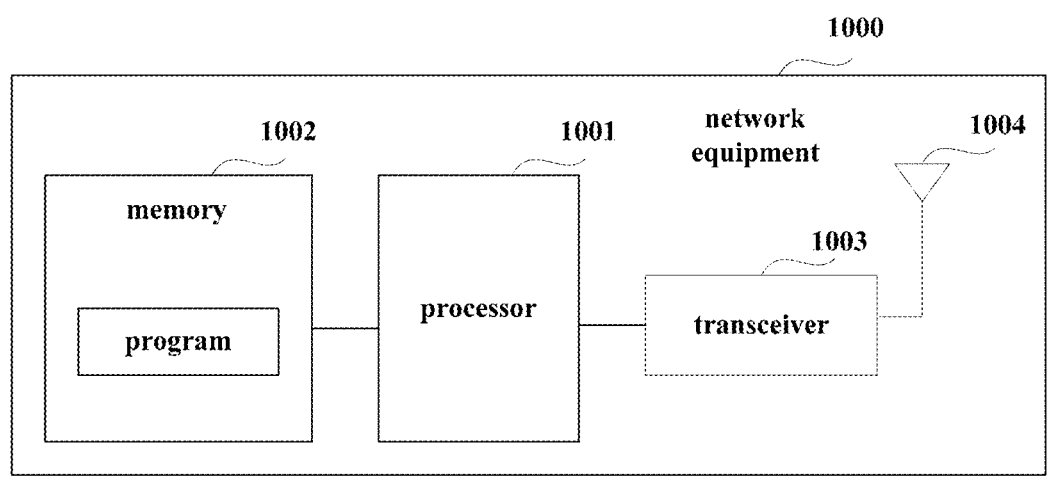
FIG. 10 is a schematic diagram of a structure of the network equipment of Embodiment 8 of this disclosure.

FIG. 10 is a schematic diagram of a structure of the network equipment of this embodiment. As shown in FIG. 10, a network equipment 1000 may include a processor 1001 and a memory 1002, the memory 1002 being coupled to the processor 1001. The memory 1002 may store various data, and furthermore, it may store a program for data processing, and execute the program under control of the processor 1001, so as to receive various information transmitted by a UE, and transmit request information to the UE.

In one implementation, the functions of the apparatus for recovering network connection described in Embodiment 5 or Embodiment 6 may be integrated into the processor 1001.

For example, the processor 1001 may be configured to: receive a radio link failure report transmitted by UE via a split signaling radio bearer, or a radio link failure report of a first network equipment transmitted by the UE via a secondary cell group signaling radio bearer; and transmit the radio link failure report or a message of the radio link failure of the first network equipment to a network side.

For another example, the processor 1001 may also be configured to: receive a failure report of a first cell transmitted by UE, or a radio link failure report or a message of radio link failure of a first network equipment transmitted by a second network equipment; and change a first cell for the UE and maintain a second cell according to the failure report of a first cell, or change first network equipment for the UE and/or change a first cell for the UE according to the radio link failure report or the message of radio link failure of the first network equipment.

In another implementation, the apparatus for recovering network connection described in Embodiment 5 or Embodiment 6 and the processor 1001 may be configured separately. For example, the apparatus for recovering network connection described in Embodiment 5 or Embodiment 6 may be configured as a chip connected to the processor 1001, with its functions being realized under control of the processor 1001.

Furthermore, as shown in FIG. 10, the network equipment 1000 may include a transceiver 1003, and an antenna 1004, etc. Functions of the above components are similar to those in the related art, and shall not be described herein any further. It should be noted that the network equipment 1000 does not necessarily include all the parts shown in FIG. 10, and furthermore, the network equipment 1000 may include parts not shown in FIG. 10, and the related art may be referred to.

With the network equipment of this embodiment, in a case where radio link failure occurs in a first network equipment (such as a master base station) and a signaling radio bearer of a second network equipment (such as a secondary base station) is still available, or a physical layer issue or random access issue occurs in a first cell (such as a primary cell) but a second cell (such as a secondary cell) is still available, by changing the first network equipment and/or the first cell for the UE, connection with the network side may be recovered, and data loss may be reduced.

Embodiment 9

The embodiment of this disclosure provides a communication system, including the UE described in Embodiment 7 and the network equipment described in Embodiment 8.

As the UE and network the equipment have been described in Embodiment 7 and Embodiment 8, the contents of which are incorporated herein, which shall not be described herein any further.

An embodiment of the present disclosure provides a computer readable program, which, when executed in an apparatus for recovering network connection or a UE, may cause the apparatus for recovering network connection or the UE to carry out the method for recovering network connection as described in Embodiment 1.

An embodiment of the present disclosure provides a computer storage medium, including a computer readable program, which may cause an apparatus for recovering network connection or a UE to carry out the method for recovering network connection as described in Embodiment 1.

An embodiment of the present disclosure provides a computer readable program, which, when executed in an apparatus for recovering network connection or a network equipment, may cause the apparatus for recovering network connection or the network equipment to carry out the method for recovering network connection as described in Embodiment 2 or Embodiment 3.

An embodiment of the present disclosure provides a computer storage medium, including a computer readable program, which may cause an apparatus for recovering network connection or a network equipment to carry out the method for recovering network connection as described in Embodiment 2 or Embodiment 3.

The above apparatuses and methods of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 6-8 may either correspond to software modules of procedures of a computer program, or correspond to hardware modules. Such software modules may respectively correspond to the steps shown in FIGS. 2-4. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An apparatus for recovering network connection, configured in a user equipment (UE), the apparatus comprising:
    a memory that stores a plurality of instructions;
    processor circuitry that couples to the memory and is configured to execute the instructions to:
    detect a radio link failure with a first network equipment;
    in a case where the UE is configured with dual-connectivity and when the radio link failure is detected,
        when a split signaling radio bearer (SRB) is available, transmit a radio link failure report of the detected radio link failure to the first network equipment through a second network equipment via the split signaling radio bearer (SRB) that is configured in the UE for transmitting control signal to the first network equipment directly and/or through the second network equipment, and
        when a first signaling radio bearer is available, transmit a radio link failure report of the detected radio link failure to a second network equipment via the first signaling radio bearer that is configured in the UE for transmitting control signal to the second network equipment.

2. An apparatus for recovering network connection, configured in a second network equipment, the apparatus comprising:
    a memory that stores a plurality of instructions;
    processor circuitry that couples to the memory and is configured to execute the instructions to:
    in a case where a user equipment (UE) is configured with dual-connectivity and when a radio link failure between the UE and a first network equipment is detected by the UE,
        when a split signaling radio bearer (SRB) is available, receive a radio link failure report of the detected radio link failure transmitted by the UE via the split signaling radio bearer (SRB) that is configured in the UE for transmitting control signal to a first network equipment directly and/or through the second network equipment, and
        when a first signaling radio bearer is available, receive a radio link failure report of the detected radio link failure transmitted by the UE via the first signaling radio bearer that is configured in the UE for transmitting control signal to the second network equipment; and transmit the radio link failure report to the first network equipment.

3. An apparatus for recovering network connection, configured in a first network equipment, the apparatus comprising:

a memory that stores a plurality of instructions;

processor circuitry that couples to the memory and is configured to execute the instructions to:

in a case where a user equipment (UE) is configured with dual-connectivity and when a radio link failure with the UE is detected by the UE, when a split signaling radio bearer (SRB) is available, receive a radio link failure report of the detected radio link failure transmitted by the UE via the split signaling radio bearer (SRB) that is configured in the UE for transmitting control signal to the first network equipment directly and/or through a second network equipment, and when a first signaling radio bearer is available, receive a radio link failure report of the detected radio link failure transmitted from the UE to a second network equipment via the first signaling radio bearer and then transmitted from the second network equipment, the first signaling radio bearer being configured in the UE for transmitting control signal to the second network equipment; and change a first network equipment for the UE according to the radio link failure report.

* * * * *